United States Patent [19]

Sherman

[11] Patent Number: 4,608,774

[45] Date of Patent: Sep. 2, 1986

[54] CONSTRUCTION FOR ROACH TRAPS

[76] Inventor: Daniel A. Sherman, 76 Ninth Ave., New York, N.Y. 10011

[21] Appl. No.: 474,236

[22] Filed: Mar. 11, 1983

[51] Int. Cl.⁴ ............................................. A01M 1/02
[52] U.S. Cl. ......................................... 43/114; 43/121
[58] Field of Search .................. 43/121, 114, 131, 122

[56] References Cited

U.S. PATENT DOCUMENTS

| | | | |
|---|---|---|---|
| 1,192,334 | 7/1916 | Martin | 43/121 |
| 1,623,439 | 4/1927 | Rawlings | 43/121 |
| 1,667,048 | 4/1928 | Rawlings | 43/121 |
| 4,030,233 | 6/1977 | Wunsche | 43/121 |
| 4,263,740 | 4/1981 | Hemsarth et al. | 43/121 |

*Primary Examiner*—Nicholas P. Godici
*Assistant Examiner*—Chris McKee

[57] ABSTRACT

This invention relates to gravity operated roach traps in general, and more specifically to a two piece molded roach trap having an improved rectangular funnel design, which produces a steeply angled funnel surface, having an enlarged opening to insure that the roach will be deposited directly into the trap receptacle and will not be able to use the opposing wall surfaces to impede or frustrate its descent into the receptacle. In addition, the funnel is also provided with a recess on at least one of its faces, for retaining a lure or attractant to induce a roach to enter the funnel.

15 Claims, 5 Drawing Figures

CONSTRUCTION FOR ROACH TRAPS

BACKGROUND OF THE INVENTION

The prior art is replete with gravity operated nonreturn insect traps, which employ a funnel shaped opening which deposits insects into a holding container or receptacle, from whence the insect cannot escape. Examples of these prior art devices may be seen by reference to the following U.S. Pat. Nos.; 21,726; 111,291; 400,460; 400,572 and 1,867,252.

As can be seen be reference to the above cited patents not only is the prior art very old, but there have not been any major improvements in the design and construction of this type of a device in recent times. Normally, this lack of activity would indicate that the design of this type of a device has been prefected to such a degree, that further improvements are not possible. However, that is not the case with the present invention, which represents a tremendous advancement over the prior art, particularly attractive reduced size roach traps which are currently being marketed.

Miniature or reduced size roach traps are attractive to the consumer, due to the fact that they can be placed in those out of the way inaccessable areas that roaches seem to prefer such as behind refrigeration, under sinks, next to pipe entries, etc.

One of the problems that arises when the prior art devices have been miniaturized is that the dynamics of entry of the insect is drastically altered, due to the proximity of the opposing walls of the funnel or chute.

This proximity of the wall surfaces, and the reduction in size of the chute opening allows a large roach to feel the opposite wall with its antenna. Once the insect is aware of the converging sruface it will instinctively reach for the surface to slow its descent into the trap, and if the roach is sufficiently large, it can oftentimes not only stop its downward travel, but also obtain enough purchase between the opposing surface to clamber out of the trap entirely.

It can be appreciated therefore that more than a mere reduction of dimension of the prior art devices is required to produce an efficient miniaturized roach trap, and that it was necessary to rethink the entire concept of the chute design, to produce an effective roach trap, which would not give the insect the opportunity to anticipate its impending predicament as it falls down the sides of the chute.

The results of that rethinking process are engodied in the present invention and mark the first true advancement in this area of technology in a substantial number of years.

SUMMARY OF THE INVENTION

An object of the present invention is the provision of a safe, efficient, economical roach trap of reduced dimension having a vastly improved chute configuration.

Another object of the present invention is the provision of a clean, effective roach trap which despite its small size has an insect capacity comparable to larger unites.

Still another object of the present invention is the provision of a miniaturized roach trap, which due to its compactness can fit into areas which would be inaccessible to the larger insect traps due to their bulky size.

Yet another object of the present invention is the provision of an improved chute configuration for a roach trap, wherein an offset opening, on one of the walls of the chute, prevents the insect from sensing that it is about to drop into the trap receptacle.

A still further object of the present invention is the provision of retention means on the lower portion of the chute, for holding a lure or attractant, within the converging opening formed by the sides of the chute, and at a level that will insure that the roach is committed to the slide, and cannot possibly turn around or back out of the trap.

These other objects, advantages and novel features of the invention will become apparent from the detailed description which follows, when considered in conjunction with the accompanying drawings.

DETAILED DESCRIPTION OF THE PREFERRED EMBODIMENT

Figure 1:
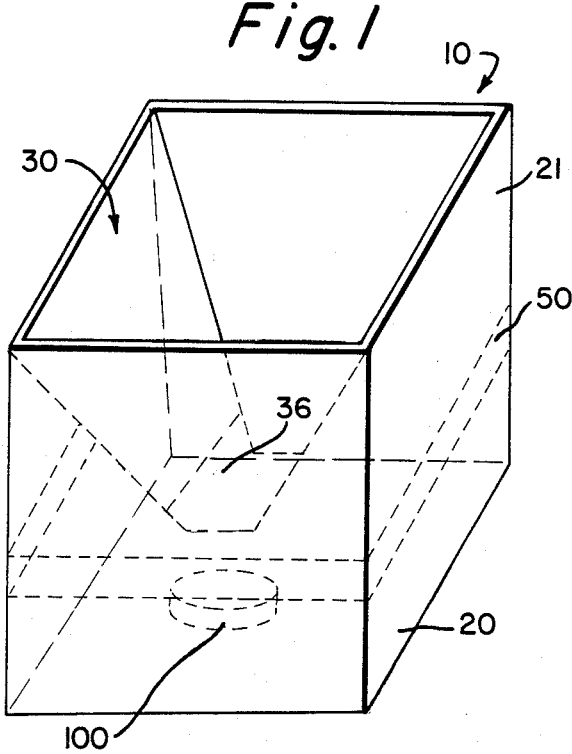
FIG. 1, is a perspective view of the improved roach trap which forms the present invention.

As can be seen by reference to FIG. 1, the improved roach trap which forms the present invention, is designated generally as 10, and is rectangular or cubic in external appearance.

In the preferred embodiment the roach trap 10, consists of only two structural components a receptacle 20, and a chute 30. The receptacle 20, is in the form of five sided, open ended cube 21, and is preferably formed of molded plastic. The interior of the receptacle 20, forms the confinement zone of the device, as will be explained further on in greater detail.

Figure 2:
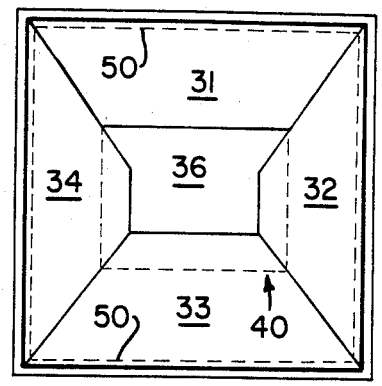
FIG. 2, is a top plan view of the improved chute configuration with its off-set opening.

Referring now to FIG. 2, it can be seen that the chute 30, is comprised of a one piece molded plastic structure having four downwardly angled walls 31 thru 34. These smooth walls 31, 32, 33, 34 form a generally rectangular opening, over most of their combined length; however, a portion of wall 31, does not project into the trap receptacle the same amount as the remaining walls 32, 33 and 34. While all of the walls are contiguous, three of the contiguous walls 32, 33 and 34 project the same vertical distance into the receptacle, even though their respective widths may vary in the same horizontal plane. As a result of this configuration, an off-set opening 35, is created in wall 31, which increases the effective size of the chute opening 36, by appoximately 50%.

Figure 3:
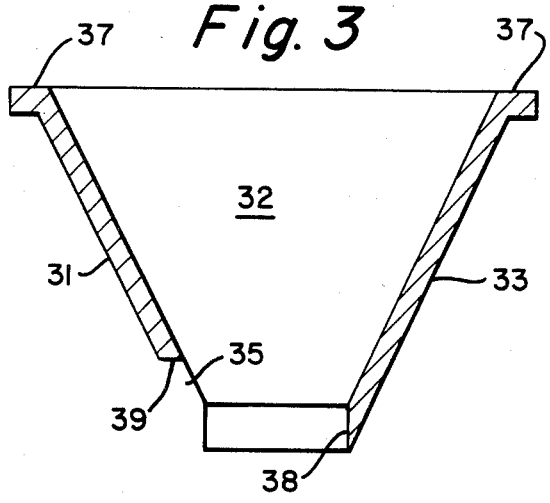
FIG. 3, is a cross-sectional view of the chute taken thru line 3—3 of FIG. 2.
Figure 4:
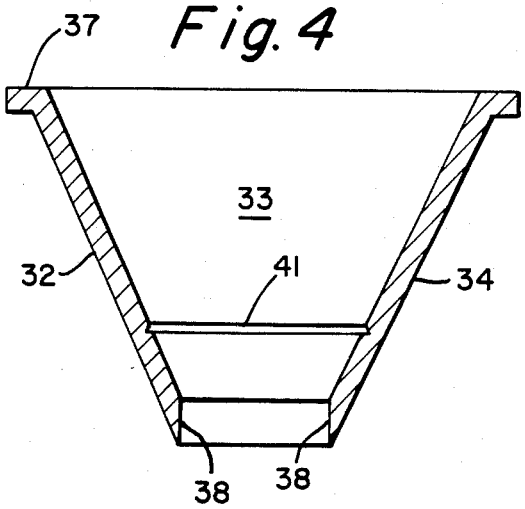
FIG. 4, is a cross-sectional view of the chute taken through line 4—4 of FIG. 2.

As shown in FIGS. 3 and 4, the walls 32 and 34, have the same dimensions, while the walls 31 and 33, share similar dimensions, with the exception of the foreshortened portion of wall 31, which forms the off-set opening 35. It should also be noted that the walls 31 and 33, are substantially wider than the width of the adjacent walls 32 over most of their length. The only point where the width of all of the contiguous walls are equal, is at the top of the cube opening, where all of the walls are provided with an outwardly projecting lip portion 37, which forms a bearing surface for supporting the chute 30, within the receptable 20.

In the preferred embodiment, the chute lip is intended to be rigidly cured or permanently bonded to the open end of the receptacle. One of the reasons for this is that even though this device is not intended for use with a poison to hasten the demise of the trapped roaches, it can be used in such a manner, and the permanent boding will lessen the likelihood that any of the poison will be spilled, thereby contaminating the area surrounding the point of use.

For a totally ecological safe device, that can be re-used, this invention also contemplates a snap fitting cooperation, by any number of well recognized means, between the receptacle and the chute, so that the roach trap may be disassembled, to empty the contents of the receptacle, and put back together for continuous and repeated usage. In addition, the trap is intended for use with a double stick adhesive tape to releasably secure the trap to a horizontal or verticle surface at the point of use.

In order to arrive at the chute configuration illustrated in FIGS. 2 thru 4, the walls 31 and 33, were disposed downwardly at an angle of 27°, and the walls 32 and 34, were disposed downwardly at an angle of 32°. Regardless of the specifice angles chosen for the respective wall surfaces, the angle of inclination of the walls will never be less than 10% and will preferably fall in the range of 11° to 45°, so that an insect on the incline will be drawn by gravity through the opening and into the receptacle.

As illustrated in FIGS. 3 and 4, the contiguous walls 32, 33, 34, project downwardly into the recptacle interior of the same vertical distance, and each of these walls terminates in a vertically aligned knife edge 38. Wall 31, on the other hand, terminates in a horizontally disposed knife edge 39, and only extends a portion of the vertical distance into the receptacle that the other walls do. The actual length of this wall surface will vary from a minimum of two-thirds to a maximum of three quarters of the actual length of the other walls. Anything less, than that length, will allow the roach to sense the opening prior to committing itself to the inclined wall, and permit the roach to retreat from the opening. Anything more than that length, will allow a large roach to sense the opposing wall, and use the restricted entrance to the chute outlet to gain purchase, and extract itself from its predicament.

It should also be appreciated that the orientation of the respective knife edges on the walls, presents a sudden surface transition at the entrance of the receptacle, which not only aides in depositing the insects into the receptacle, but also forms sharp edges, which will tend to prevent the roaches from gaining access back into the chute.

Figure 5:
FIG. 5, is an enlarged cross-sectional view of the lure or attractant retention means formed on one of the walls of the chute.

The remaining unique structural features found in this device is a lure or attractant retention means 40, which is disposed on at least one of the chute wall surfaces. The retention means 40, comprises an elongated horizontally disposed groove or recess 41, formed in the lower portion of at least one of the chute walls. As can best been seen in FIG. 5, the groove 41, is generally L-shaped, in configuration, and forms a shallow reservoir for the lure or attractant.

To activate the roach trap 10, a liquid attractant is deposit on one or more of the grooved walls. The liquid will flow down the sloped surface and collect in the groove, whereupon it will crystalize and function as an attractant in its crystal form. The excess liquid will obviously be deposited into the receptacle interior, where it also will crystalize and function as an attractant.

It should be noted at this point that the position of the groove or grooves 41, is crucial to the operation of this device. The groove 41, must therefore be disposed on the lower portion of the wall surface, so that the insect in an attempt to reach the attractant, must commit itself to the chute. Therefore, even if the insect attempts to turn around, the smooth slide surface of the chute, and the force of gravity, will propel the insect into the receptable. For this reason, in the preferred embodiment, the grooves must be provided on the lower third of one or more of the longer wall surfaces.

As can best be seen by reference to FIGS. 1 and 2, the interior vertical walls of the cube 20, are further provided with a strip of adhesive material 50, disposed proximate the midpoint of the vertical walls. The purpose of this arrangement, is to not only prevent the roaches from climbing the interior walls to escape; but more importantly to trap them in a vertically disposed position against the interior walls, so that the full capacity of the cube is utilized. This latter feature also insures that the trapped roaches will be held captive around the periphery of the cube and away from the chute opening 36, so that the chute opening will be unobstructed, and the maximum number of roaches can be contained with the trap. This invention also contemplates coating the chute 30 and surfaces 31 thru 34, with a lubricant such as silicone or vaseline to enhance the downward travel of the roaches into the chute opening.

While this invention has heretofore been characterized as being used in conjunctin with a liquid attractant, as can best be seen by reference to FIG. 1, a solid attractant 100, in pellet form may also be used. In one form of the preferred embodiment, the solid attractant is dimensioned to pass through the opening 36, and comprises a combination of non-poisonous food products, that when activated by the addition of a small amount of warm water will cause most of the solid components to dissolve, interact and ferment.

This fermentation process releases a low level of carbon dioxide, that attracts roaches into the trap, and also produces an alcohol base that drugs the roaches into a stupor, causing them to either drown in the water, or reduces their ability to climb from the trap.

The basic ingredients of the solid lure or attractant 100 are: active yeast; instant potato; malt; the food additive such as instant potato in conjunction with the fermentation ingredients, enhances the attraction, by providing a food smell that draws the roaches into the area of the trap. Due to the fact that the roach perceives the lure as a food source, the female roach will enter the trap with her egg sack attached. This means that a roach, which has the potential of producing over 1,200 offspring per month, will die without leaving her eggs in a remote area, as they do when affected by conventional poisons.

It should be appreciated at this point, that due to the configuration of the opening and the solid construction of the traps, water will remain in the trap for a sufficient period of time to insue the luring and killing of the roaches. It should also be appreciated that the use of the improved roach trap with the liquid attractant previously mentioned, is not incompatible with the solid attractant; in as much as most of the ingredients in the solid version are water soluble, and the liquid and solid attractions can be used separated or in conjunction one one another.

It should also be noted that the inverted pyramid configuration formed at the top of the device, collects the moisture generated during the fermentation and evaporation processes, and returns the moisture to the bottom of the trap, thereby prolonging the "usefull life" of the attractant. In addition, regardless of whether liquid or solid attractants are used, the inverted pyramid shape will retain the attractant within the device, should it be tipped over, or accidently inverted. This feature is particularly important when the device is used around small children or pets, since the toxins are less likely to contaminate the surrounding environment.

Having thereby described the subject matter of the preferred embodiment, it should be obvious that many substitutions, modifications and variations of the invention are possible in light of the above teachings. It is therefore to be understood that the invention as taught and described, is only to be limited by the breadth and scope of the appended claims.

What I claim is:

1. An improved gravity operated insect trap for use with an attractant comprising;
    a rectangular, open ended receptacle for receiving the insect, and
    a chute member adapted to be secured to, and supported by, the open end of the receptacle, wherein the chute comprises three contiguous wall surfaces which project the same vertical distance into the receptacle interior and another contiguous wall surface which projects a portion of the vertical distance into the receptacle to form an off-set opening into the interior of the receptacle wherein the said another contiguous wall surface projects a minimum of two thirds and a maximum of three quarters of the vertical distance that the said three contiguous wall surfaces project into the receptacle interior to form said off-set opening whereby the off-set opening increases the effective surface area of the chute opening.

2. An improved gravity operated insect trap as in claim 1; wherein,
    the chute is further provide with an attractant retention means on at least one of the said contiguous wall surfaces.

3. An improved gravity operated insect trap as in claim 2; wherein,
    the attractant retention means comprises a horizontally disposed groove on at least one of the said contiguous wall surfaces.

4. An improved gravity operated insect trap as in claim 3; wherein,
    the horizontal groove is disposed on the lower third of at least one of said three contiguous wall surfaces.

5. An improved gravity operated insect trap as in claim 4; wherein,
    the rectangular open ended receptable is in the form of an open ended cube.

6. An improved gravity operated insect trap as in claim 5; wherein,
    both the chute and the receptacle are formed of plastic.

7. An improved gravity operated insect trap as in claim 6; wherein,
    the chute and receptacle are permanently bonded to one another.

8. An improved gravity operated insect trap as in claim 6; wherein,
    the chute and receptacle are releasably connected to one another.

9. An improved gravity operated insect trap as in claim 5; wherein,
    the vertical interior sides of the open ended cube are provided with a strip of adhesive disposed proximate their midpoints.

10. An improved gravity operated insect trap as in claim 1; wherein,
    the surface of the chute is coated with a lubricant.

11. An improved gravity operated insect trap as in claim 3; wherein,
    the attractant is in liquid form.

12. An improved gravity operated insect trap as in claim 1; wherein,
    the attractant is in solid form.

13. An improved gravity operated insect trap as in claim 12; wherein,
    the attractant comprises water soluble ingredients.

14. The imposed gravity operated insect trap as in claim 13; wherein,
    the attractant comprises food additives.

15. The improved gravity operated insect trap as in claim 14; wherein,
    the attractant reacts with water to produce fermentation.

* * * * *